H. TILDEN.
Gas Machines.
No. 138,715.  Patented May 6, 1873.
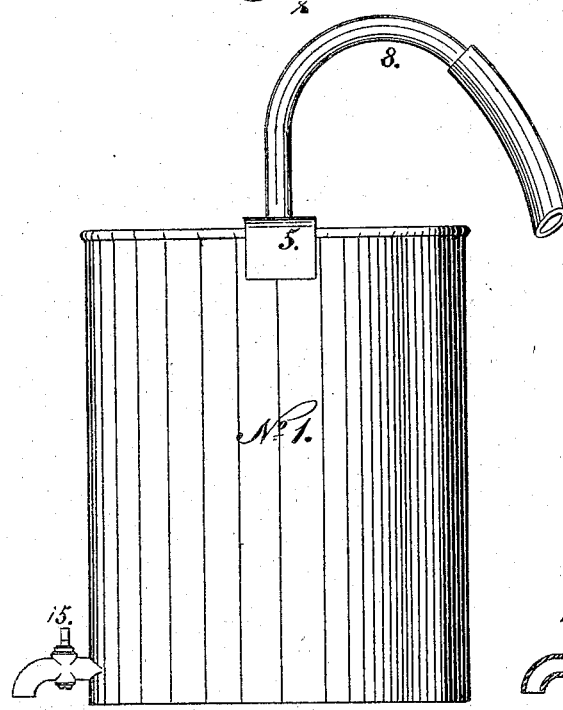
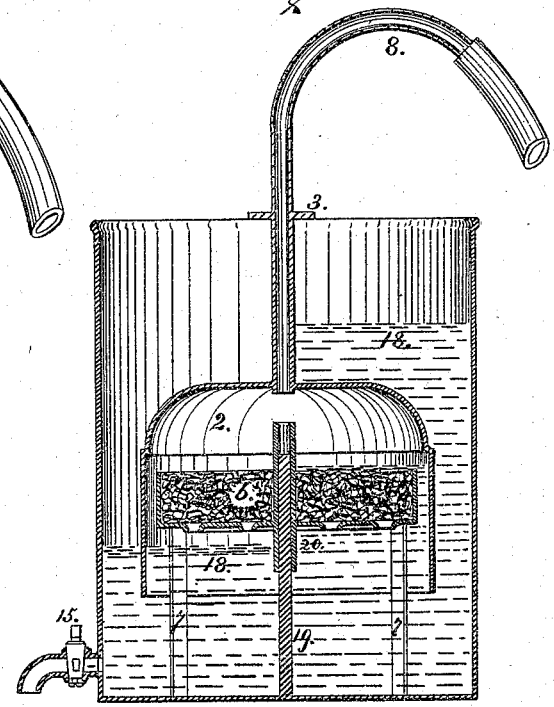
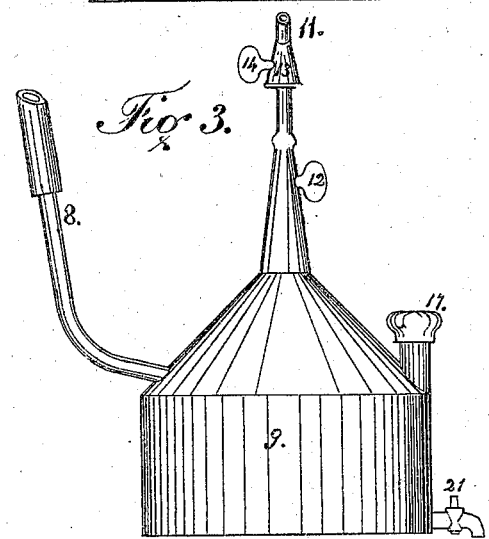
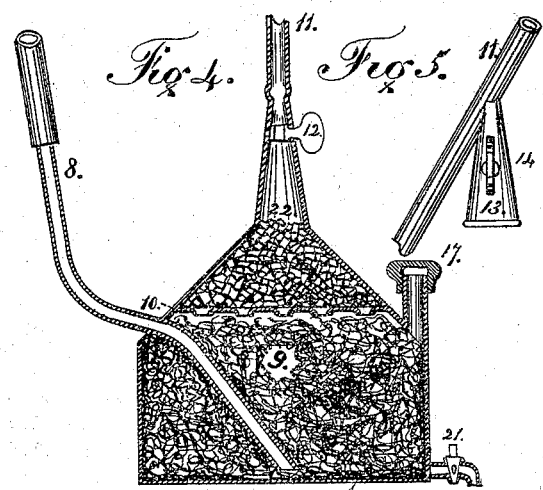
Witnesses:
Benjamin C. Pole.
Inventor:
Howard Tilden

UNITED STATES PATENT OFFICE.

HOWARD TILDEN, OF PHILADELPHIA, PENNSYLVANIA.

IMPROVEMENT IN GAS-MACHINES.

Specification forming part of Letters Patent No. 138,715, dated May 6, 1873; application filed April 17, 1873.

*To all whom it may concern:*

Be it known that I, HOWARD TILDEN, of the city and county of Philadelphia, in the State of Pennsylvania, have invented an Improved Gas-Machine; and I hereby declare the following to be a full and exact description thereof, reference being had to the accompanying drawing forming part of this specification.

The nature or essence of my invention consists in the particular construction, combination, and arrangement of devices forming the improved gas-machine described in the following specification and represented in the drawing.

In the accompanying drawing, Figures 1 and 2 are an elevation and vertical section of the gas-generator. Figs. 3 and 4 are an elevation and vertical section of the carbureter, and Fig. 5, of the conveying-pipe and drip-cup.

In the drawing, 1 is a cylindrical vessel made of copper, galvanized iron, or wood, to contain a solution of about nine parts of water to one of sulphuric acid. In the center of this cylinder I erect the standard 19 to hold the copper basin 6 in place, by means of the tube 20 fastened in the basin. The basin 6 is supported by the legs 7 7 7, about six inches above the lower edge of the bell 2; the bottom of which basin is perforated and filled with cast or wrought iron chips—either of which will answer. The gas-receiver, or bell 2, is suspended over the basin 6, by the rods 44 and pipe 8, from the bar 3, across the top of the cylinder 1; and the lower edge of the bell dips into the acidulated water to within three inches of the bottom of the cylinder 1, so that the hydrogen gas, formed by the solution of acidulated water on the iron chips, rises in the bell 2, and passes from it through the pipe 8 to the bottom of the carbureter 9, which may be a cylindrical vessel having the space below the screen 10 filled with liquid carbon, the product of petroleum and Sisal hemp or grass, which comminutes or divides the gas into very fine particles, and distributes it thoroughly among the liquid carbon to carburet the hydrogen gas and give it large illuminating properties; after which it passes through the screen 10 in among and through the charcoal above the screen, which absorbs any superabundance of carbon from the gas, which now passes up or off through the pipe 11 to the burners where it is to be consumed. The pipe 11 has the drip-cup 14 attached to it to receive any liquid that may be condensed in the pipe, and which may be drawn off by the cock 13. There is a cock, 21, at the bottom of the carbureter for drawing off the remains of the liquid carbon whenever it is desirable to renew it. The cock 12 on the pipe 11 is for shutting off the gas from the burners, so that the gas formed in the bell 2 will have no means of escape, and will force the acidulated water down in the bell below the bottom of the basin 6 and away from the iron chips, and stop the generation of gas until the cock 12 is opened, when the water will force the gas out of the bell and rise in the basin, and the generation of the gas will begin again.

The object of my invention is to secure a more uniform carbureting of the hydrogen gas before it passes to the service-pipe 11, as, with the machines of this nature heretofore in use, there has been much complaint that the gas at the burner is sometimes scarcely more than simple hydrogen, so little carbon has it taken up, consequently possessing very little illuminating power, while at other times so much carbon has been absorbed that much will escape at the burner in the form of smoke; and not only this but a condensation of portions thereof in the service-pipes very soon chokes them up. These things I remedy by filling the carbureter 9 with fine curled Sisal hemp or grass. The peculiar effect of this filling is as follows: The hydrogen gas, coming down through the pipe 8, is very volatile, and the curled Sisal hemp obstructs its passage through the carbureter 9, and causes it to take many turnings and windings in its way to the service-pipe 11, absorbing carbon all the while to give it illuminating power, and especially, when a very considerable portion of the liquid carbon in 9 has been exhausted, will the Sisal hemp be covered with innumerable minute globules of the carboniferous liquid, which the passing hydrogen, warm from the generator 1, will rapidly take up; while, if—by a general high temperature or a high degree of volatility of the liquid carbon, one or both—if the gas, on reaching the screen 10, should contain too much carbon, the charcoal above the screen and the Sisal will absorb more or less of this superabundance, so that often, in condensed or liquid form, it will settle in minute globules upon all the surface of the charcoal, to be at some future time taken up, when, as might and will sometimes happen from too low a temperature or too great specific gravity of the liquid carbon, the gas entering the carbureter is deficient in illuminating properties.

The working of my machine will be so readily understood from the drawing and foregoing description that there remains only to say that it is automatic in its operation, as, by placing a sufficient quantity of acidulated water in the cylinder 1, to rise a little higher than the top of the basin 6, and filling the basin with iron chips, and supplying the carbureter 9 with liquid carbon, the machine is ready to perform the work intended.

The action of the acid upon the contents of the basin 6 immediately sets free a comparatively pure hydrogen gas, which, rising to the upper portion of the bell 2, will accumulate until the pressure produced is sufficient to force it down through the pipe 8 into the vessel of liquid carbon 9, whence, working its way slowly through the filling of Sisal hemp, it rises, through the pipe 11, to the burners, the hydrogen gas having taken up a sufficiency of the carbon or illuminating principle of the liquid carbon in 9 to make it a very superior gas for lighting purposes, and ready for use whenever required; but when no consumption of gas is going on, the accumulation thereof in the bell 2 will soon become such that, by pressure, it will react through the tubes which conveys it to the burners, upon the non-carbureted hydrogen in the bell 2, and thereby occasioning, by the continued supply from the chemical action in the basin 6, such a pressure on the surface of the acidulated solution in 1 as to cause it to fall—a rise at the same time taking place in the cylinder 1, outside the bell 2; and this continues until the acidulated solution has fallen in the bell quite free from the basin, when the further production of hydrogen gas will cease, and the whole apparatus be at rest; but, as soon as the burners are lighted, and the pressure within the bell 2 relieved so that the column of liquid outside the bell will descend, causing it to rise in the bell until the basin of chips is covered, when the production of hydrogen will be at once resumed, and the apparatus will promptly perform its functions.

These gas-machines may be of any size desired; the material in the structure of the parts coming in contact with the acidulated solution should be such as would not be consumed by the acid. The apparatus may be placed in any convenient locality, out-building, or basement.

What I claim as my invention, and desire to secure by Letters Patent, is—

1. The combination of the cylinder 1, bell 2, basin 6, pipe 8, hydrocarbon-compartment 9, standard 19, and drip-cup 14, as described and illustrated.

2. The construction and arrangement of cylinder 1, bell 2, basin 6, pipe 8, hydrocarbon-compartment 9, standard 19, drip-cup 14, as and to operate as set forth and described.

3. The Sisal hemp in the lower part of the hydrocarbon-compartment 9 in combination with the charcoal in the upper part above the screen 10, separating the charcoal from the Sisal hemp, as described and set forth.

HOWARD TILDEN.

Witnesses:
J. DENNIS, Jr.,
THOMAS C. CONNOLLY.